United States Patent [19]
Kmetyko

[11] 3,964,788
[45] June 22, 1976

[54] HEADREST FOR VEHICLES

[76] Inventor: Joseph Kmetyko, 922 Windsor St., Chicago, Ill. 60640

[22] Filed: July 3, 1974

[21] Appl. No.: 485,743

[52] U.S. Cl. ............................. 297/395; 108/149;
[51] Int. Cl.² ......................................... A47C 1/10
[58] Field of Search ............ 108/149; 248/333–338; 297/391, 395

[56] References Cited
UNITED STATES PATENTS

| | | | |
|---|---|---|---|
| 1,761,832 | 6/1930 | Johansson | 248/334 X |
| 2,649,142 | 8/1953 | New | 197/395 |
| 2,827,350 | 3/1958 | Galloway | 108/149 X |
| 3,185,487 | 5/1965 | Lagace | 277/20 |
| 3,310,342 | 3/1967 | Drelichowski | 297/395 |
| 3,703,313 | 11/1972 | Schiesterz et al. | 297/391 |

*Primary Examiner*—James C. Mitchell

[57] ABSTRACT

A headrest intended for mounting on the ceiling or roof of a vehicle above the head of an occupant of the vehicle who is sitting in a vehicle seat, the headrest mounted for vertical adjustment by a telescoping shaft so that the head rest lies directly behind the occupant's head, with the headrest being swingably movable forwardly or rearwardly with respect to the occupant along an arcuate path relative to the vehicle ceiling, this forward and rearward movement effected by a reversable electric motor mounted in the ceiling and having a gear driven thereby and engaging an arcuate segment gear attached to the top end of the telescopic shaft, the headrest thus being swingable forwardly or rearwardly relative to the occupant of the vehicle as well as being vertically adjustable such that the headrest may be properly adjusted to lie directly behind the occupant's head in the most comfortable and safe position for use. In addition, when the headrests are not in use they may be readily moved to a position not affecting any possible lines of vision of the vehicle driver.

8 Claims, 6 Drawing Figures

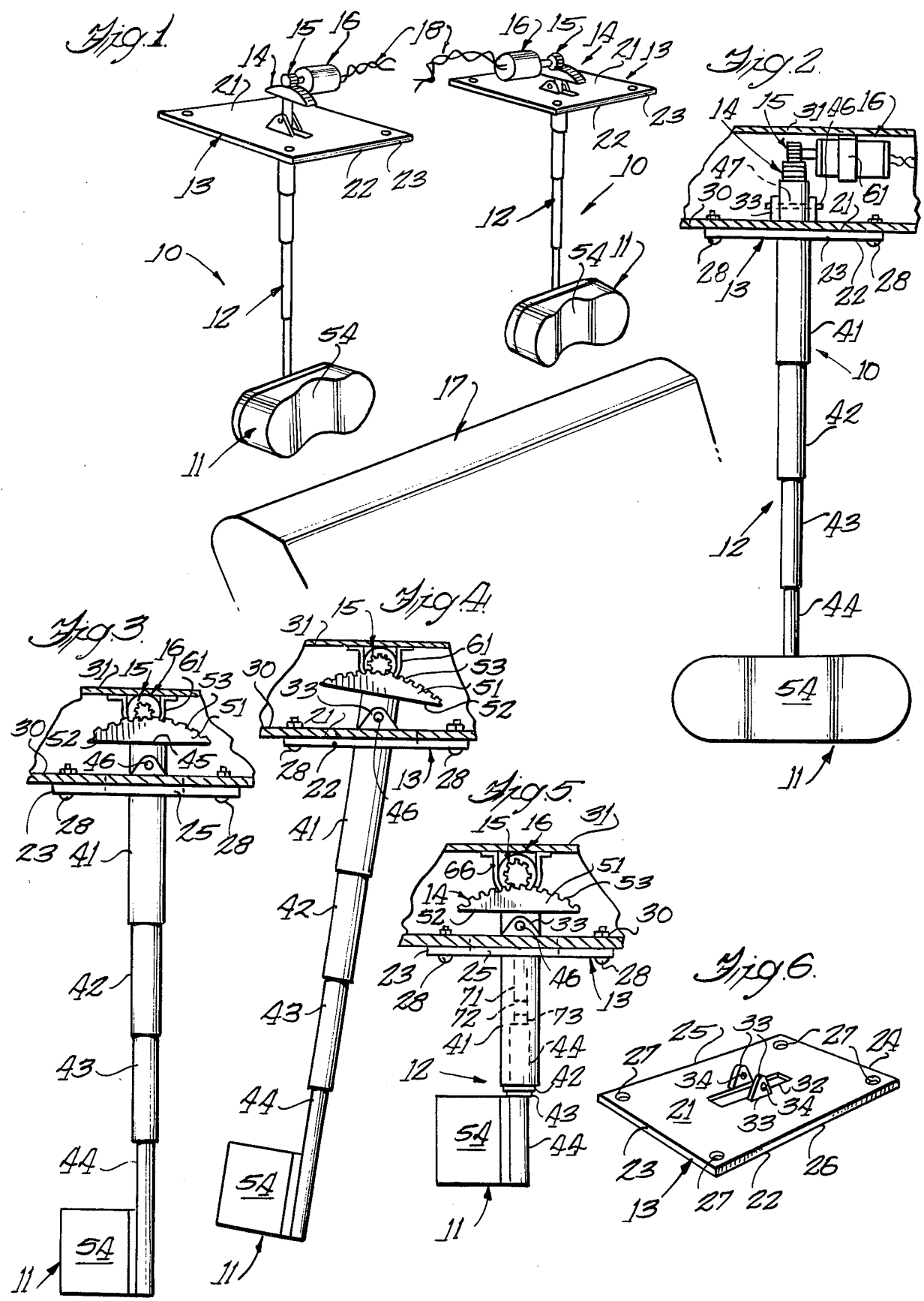

HEADREST FOR VEHICLES

BACKGROUND OF THE INVENTION

1. Field of the Invention

This invention relates generally to vehicles and more particularly to a novel safety headrest for use in a vehicle for the prevention of injuries to occupants of a vehicle in the event of an accident, particularly to prevent injuries of the kind caused by what is commonly referred to as "whiplash" which is the sudden snapping back of the head of an occupant of a vehicle such as which occurs when a vehicle is struck in the rear by another vehicle or the like.

2. Description of the Prior Art

When a vehicle is struck in the rear by another vehicle or the like, the head of a person riding in the front vehicle which has been struck in the rear snaps backward suddenly, this placing a severe strain on the person's neck at the base of the skull and is known to frequently result in a fracture of one or more cervical vertebrae or in some other injury to the person's spinal column. This type of injury is commonly referred to as "whiplash" which is caused by the sudden snapping back of the person's head.

In an attempt to reduce the risk of whiplash, headrests of various kinds have been provided in an attempt to prevent the head from snapping back in the situation where whiplash normally occurs. However, such devices, even though they are intended to prevent injury due to whiplash, have been inadequate for one reason or another, such as lack of complete vertical and horizontal adjustment for the comfort and safe positioning relative to occupants of different physical sizes; hard to adjust; potentially hazardous as they affect the vehicle drivers' line of vision when viewing out of side and back windows to view surrounding traffic when having to maneuver in such traffic, and the like.

SUMMARY OF THE INVENTION

The present invention remedies and overcomes the deficiencies and disadvantages of presently available headrests by providing a novel headrest structure intended for mounting on the ceiling or roof of the vehicle above the head of a vehicle occupant and which is adjustable both vertically and horizontally relative to the head of the occupant.

It is a feature of the present invention to provide a head rest for vehicles to protect a person in the vehicle against injury due to whiplash.

It is a further feature of the invention to provide a headrest for use in a vehicle and which is readily moved out of any potential line of vision of the vehicle driver when such headrest is not being used, such as when the seat with which the headrest is associated is not being occupied by any individual.

The provision of headrest for vehicles, such as briefly outlined above, and possessing the stated features and advantages, constitutes the principal features and advantages of the present invention. The provision of a headrest which may be readily manufactured at a relatively low cost and by simple manufacturing methods; one which is possessed of few parts and which therefore is unlikely to get out of order; one which is rugged and durable and which therefore may be guaranteed by the manufacturer to withstand many years of intended usage; one which is aesthetically pleasing and refined in appearance; one which is easy to use and reliable and efficient in operation; one which may, in its entirety, be manufactured and installed as part of the original equipment of the vehicle, or which may be readily attached to the vehicle later as an accessory item; and one which, otherwise, is well adapted to perform the services required of it, are further desirable features which have been borne in mind in the production and development of the present invention.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a perspective view of a pair of headrests according to the present invention in position for mounting in the ceiling of a vehicle relative to a seat of the vehicle;

FIG. 2 is a front elevational view, partially in cross-section, of a headrest mounted in the ceiling of the vehicle;

FIG. 3 is a side elevational view of the headrest of FIG. 2 with the headrest in the vertical extended position;

FIG. 4 is a side elevational view similar to FIG. 3 but with the headrest shown rotated about its axis to an adjusted position;

FIG. 5 is a side elevational view similar to FIG. 3 and showing the headrest in the collapsed vertical position; and FIG. 6 is a top perspective view of the ceiling mounting plate.

DESCRIPTION OF THE PREFERRED EMBODIMENT

Referring now to the drawings in detail there is illustrated a preferred form of a headrest constructed in accordance with the principles of the present invention and designated generally in its entirety by the reference numeral 10 and which is comprised of a head engaging portion 11 which is supported at one end of a telescopic shaft 12 having the opposite end thereof pivotally mounted for swingable movement to a ceiling mounting plate 13 adapted to be mounted to the ceiling of a vehicle, the end of the telescopic shaft having an arcuate gear segment 14 affixed thereto with the gears of such segment in engagement with a gear 15 mounted on the shaft of a direct-current electric motor 16. The telescopic shaft 12 provides for the vertical adjustment of the head engaging portion 11 between a collapsed position adjacent ceiling mounting plate 13, and a maximum extended position projecting away from the ceiling mounting plate. The motor 16 provides for the horizontal adjustment of the head engaging portion 11 relative to the vehicle seat 17 with which the headrest 10 is associated, this adjustment being swingable forwardly and rearwardly with respect to the seat so as to be in the most comfortable and safe position for an occupant of the seat. In addition, the motor 16 is connected by suitable electrical wires designated generally by reference numeral 18 to a source of electrical energy, such as the vehicle battery (not shown) through a switch conveniently located adjacent the seat 17 for use by an occupant in adjusting the headrest, with a switch (not shown) also located therefor adjacent the position of the vehicle driver (not shown) in the same manner as conventional power window type controls such that the vehicle driver may selectively move the headrests 10 which are not in use, such as when no occupant is in the seat with which the headrest is associated, thus moving such nonused headrests out of any potential line of vision of the vehicle driver.

The ceiling mounting plate is of an elongated flat rectangular configuration having a top surface 21, a bottom surface 22, opposed front and back edges 23 and 24, and opposed side edges 25 and 26. A mounting hole 27 is provided in each corner of the ceiling mounting plate 13 and are adapted for use with mounting bolts 28 for securing the ceiling plate to the ceiling 30 of a vehicle which is disposed beneath the vehicle roof 31. Disposed centrally of the ceiling mounting plate 13 is an elongated rectangular slot 32 extending between the front and back edges 23 and 24, with there being mounted centrally of the slot and on each side thereof a pivot boss member 33 each having an aperture 34 extending therethrough, the apertures 34 being in axial alignment with each other.

The telescopic shaft 12 consists of a plurality of concentrically disposed axially aligned tubular section members 41, 42, 43 and 44 with section member 41 forming the base section member and section member 44 forming the terminal section member. The base section 41 has a top end 45 which extends through ceiling mounting plate slot 32 with the top end portion being pivotally secured intermediate bosses 33, 33 by a pivot pin 46 which passes through apertures 34 and an associated aperture 47 in base section member 41. Disposed parallel to slot 32 and mounted to top end 45 of base section 41 is an arcuate gear segment 51 having a flat base portion 52 affixed at its central portion to top end 45 with the curved arcuate outer surface provided with gear teeth 53 along the length thereof. The terminal section 44 has affixed thereto the head engaging portion 11 which is provided with a cushion 54 having a face surface thereof contoured to the proper shape for the comfort and safety of a person occupying the seat so as to comfortably engage a person's head.

The motor 16 is mounted to the roof 31 of the vehicle by a bracket 61 with the motor shaft provided with the gear 15 having teeth about its outer circumference which are in engagement with teeth 53 of gear segment 51. Alternatively it is to be understood that the motor 16 may be mounted on a support bracket or the like mounted to the ceiling mounting plate 13 rather than being mounted to the roof of the vehicle.

A rod 71 extends concentrically along the axis of tube 41 and terminates inwardly thereof to support a permanent magnet 72 on the end thereof. A permanent magnet 73 is supported on the top end of tube 44 and is adapted to magnetically engage magnet 72 when the shaft 12 is in the telescopically closed position so as to detachably maintain such position.

In operation, a person occupies seat 17 and then vertically adjusts head engaging portion 11, after which through use of motor 16 the person effects the forward or rearward movement of the head engaging portion with respect to the position being occupied by the person such that the head engaging portion is in the most comfortable and safe position for the person. The vertical adjustment of the head engaging portion 11 relative to the ceiling mounting plate 13 is selectively retained by the telescopic shaft 12 with the sections 41–44 thereof being in frictional engagement with each other to retain such position, or alternatively, a series of spring loaded balls and associated detents may be provided in such section members for retaining selectable vertical positions of the head engaging portion.

Should there be no occupant in a seat for which a headrest 10 is provided, the vehicle driver may then effectively move the headrest out of any potential line of vision by merely operating the motor 16 in a manner to swing the headrest to a position not affecting the line of vision, or telescopically collapse shaft 12 with magnets 72 and 73 being engaged with each other to maintain the stored collapsed position of the headrest 10.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

Having thus described the invention, what is claimed is:

1. A headrest device intended for mounting to the ceiling of a vehicle in association with the position of a vehicle seat and above the same for preventing injury to an occupant of the vehicle occupying such seat upon impact of an external object with the vehicle, the headrest device comprising:

a ceiling mounting bracket adapted to be mounted to the ceiling of the vehicle above the vehicle seat and with respect to the head of an occupant of the vehicle, a slot extending through said ceiling mounting plate, and pivot boss means mounted on said mounting plate in association with said slot;

a telescopic shaft having a base end section and a terminal end section telescopically interconnected, such sections disposed concentrically about a common axis and adapted for axial reciprocal movement into and out of each other between a collapsed position and an extended position, said base section having a top end portion disposed furthest from said terminal end section, said base top end portion received in said ceiling plate slot and pivotally secured relative thereto adjacent said pivot boss members providing swinging movement of said telescopic shaft between forward and rearward positions in a plane extending through the longitudinal axis of said slot and taken normal to the plane of said slot itself;

a segment gear affixed centrally thereof to said top end of said base section and projecting outwardly therefrom, said segment gear having an arcuate convex outer surface with gear teeth disposed longitudinally therealong;

a head engaging portion affixed to the terminal end section of said telescopic shaft and adapted for engagement with the head of an occupant of the seat in a manner to cradle the head for the comfort of the occupant as well as to cradle the head should the vehicle be struck by an external object with the occupant's head being thrust backward during the impact; and a reversable direct current electric motor having a gear mounted on the shaft thereof, said gear in engagement with said teethed portion of said segment gear to effect the reciprocal movement of said segment gear relative to said motor upon energization of said motor from a suitable source of electrical energy;

whereby said motor effects the swinging movement of said telescopic shaft and associated head engaging portion relative to said ceiling mounting plate for adjustment thereof, and said telescopic shaft provides for the vertical adjustment of said head engaging portion relative to said ceiling mounting plate.

2. The headrest device as set forth in claim 1 further comprising:
a rod disposed concentrically along the longitudinal axis of the shaft base end section and extending through the base end section from the top portion thereof to a position inwardly of the bottom portion thereof;
a first permanent magnet attachably supported on the bottom end of the rod;
a second permanent magnet attachably supported on the top end portion of the shaft terminal end section aligned with the rod to magnetically engage the first magnet upon the telescopic collapsing of the shaft to detachably maintain the shaft in the fully collapsed storage position.

3. The headrest device as set forth in claim 2 wherein said ceiling mounting bracket is of a substantially flat rectangular configuration having a top surface, a bottom surface, opposed front and back edges, and opposed side edges, said slot being of an elongated rectangular configuration disposed centrally of said plate and extending between said front and back edges, and said pivot boss members comprising a pair of flanges, each flange having a base portion thereof secured to the top surface of said mounting plate centrally of each side of said slot and projecting outwardly therefrom, each boss member provided with an aperture extending therethrough, said apertures being in axial alignment with each other.

4. The headrest device as set forth in claim 3 wherein said base section member is provided in the top portion thereof with an opening extending diametrically therethrough, said opening adapted to be axially aligned between said pivot boss member apertures, and a pivot pin adapted to be axially inserted through said aligned apertures and opening to pivotally secure said telescopic shaft to said ceiling mounting plate.

5. The headrest device as set forth in claim 4 wherein said head engaging portion extends outwardly from the outermost end of said terminal end section in a direction parallel to said mounting plate slot.

6. A head supporting device for the occupant of a vehicle comprising:
mounting means for connection to the ceiling of a vehicle;
a telescopic shaft having a base section and an opposite end section;
a headrest mounted on said end section;
pivot menas connecting said base section to said mounting means and permitting radial movement of said shaft and headrest; and
stop means associated with said base section for releasably locking the base section in a selected position to prevent radial movement of the headrest.

7. The head supporting device of claim 6 and comprising further:
a first magnet mounted within said base section; and
a second magnet mounted atop said end section,
said first and second magnets cooperating to releasably lock said telescopic shaft in the fully retracted storage position.

8. The head supporting device of claim 6 in which said stop means comprises:
a gear segment affixed to the top of said base section and extending above said pivot means; and
a reversable direct current motor fixedly mounted with respect to the telescopic shaft and having its drive shaft in gear train engagement with said gear segment.

* * * * *